United States Patent
Lin et al.

(10) Patent No.: US 11,962,743 B2
(45) Date of Patent: Apr. 16, 2024

(54) 3D DISPLAY SYSTEM AND 3D DISPLAY METHOD

(71) Applicant: Acer Incorporated, New Taipei (TW)

(72) Inventors: Shih-Hao Lin, New Taipei (TW);
Chao-Kuang Yang, New Taipei (TW);
Wen-Cheng Hsu, New Taipei (TW);
Hsi Lin, New Taipei (TW); Chih-Wen Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 151 days.

(21) Appl. No.: 17/579,573

(22) Filed: Jan. 19, 2022

(65) Prior Publication Data
US 2022/0345679 A1  Oct. 27, 2022

(30) Foreign Application Priority Data
Apr. 21, 2021  (TW) ................. 110114283

(51) Int. Cl.
*H04N 13/139* (2018.01)
*G02B 30/00* (2020.01)
(Continued)

(52) U.S. Cl.
CPC ......... *H04N 13/139* (2018.05); *G06F 9/3017* (2013.01); *G06F 9/4411* (2013.01); *H04N 13/194* (2018.05)

(58) Field of Classification Search
CPC .............. G06F 9/3017; G06F 9/30174; G06F 9/30178; G06F 9/30196; G06F 9/30181; G06F 9/32; G06F 9/38; G06F 9/4411; G06F 9/44536; G06F 17/00; H04N 13/139; H04N 13/156; H04N 13/158; H04N 13/161;
(Continued)

(56) References Cited

U.S. PATENT DOCUMENTS

2014/0300566 A1* 10/2014 Lee ................. H04N 13/261
                                                    345/173
2016/0286208 A1*  9/2016 Drouin ............. H04N 13/111
(Continued)

FOREIGN PATENT DOCUMENTS

CN  107729049  2/2018
CN  111381914  7/2020
(Continued)

*Primary Examiner* — Wesner Sajous
(74) *Attorney, Agent, or Firm* — JCIPRNET

(57) ABSTRACT

A 3D display system and a 3D display method are provided. The 3D display system includes a 3D display, a memory, and a processor. The processor is coupled to the 3D display and the memory and is configured to execute the following steps. As a first type application program is executed, an image content of the first type application program is captured, and a stereo format image is generated according to the image content of the first type application program. The stereo format image is delivered to a runtime complying with a specific development standard through an application program interface complying with the specific development standard. A display frame processing associated with the 3D display is performed on the stereo format image through the runtime, and a 3D display image content generated by the display frame processing is provided to the 3D display for displaying.

16 Claims, 3 Drawing Sheets

(51) Int. Cl.
*G06F 9/30* (2018.01)
*G06F 9/44* (2018.01)
*G06F 9/4401* (2018.01)
*H04N 13/194* (2018.01)
*H04N 13/302* (2018.01)

(58) Field of Classification Search
CPC .. H04N 13/167; H04N 13/275; H04N 13/286; H04N 13/289; H04N 13/293; H04N 13/30; H04N 13/302; H04N 13/349; H04N 13/351; H04N 13/354; H04N 13/356; H04N 13/359; H04N 13/341; H04N 13/315; H04N 13/194; H04N 13/122; H04N 2013/405; H04N 2013/0074; G02B 30/00; G02B 27/22; G06T 2207/10012; G06T 2207/10016; G06T 2207/10021
See application file for complete search history.

(56) References Cited

U.S. PATENT DOCUMENTS

| | | | |
|---|---|---|---|
| 2017/0131964 A1* | 5/2017 | Baek | G06F 3/1423 |
| 2017/0180700 A1* | 6/2017 | Cho | H04N 13/111 |
| 2021/0077514 A1* | 3/2021 | Vora | A61K 31/706 |
| 2021/0247882 A1* | 8/2021 | Norman | G06F 3/0484 |
| 2022/0124300 A1* | 4/2022 | Lin | H04N 13/261 |
| 2023/0071576 A1* | 3/2023 | Lin | H04N 13/359 |

FOREIGN PATENT DOCUMENTS

| | | | | |
|---|---|---|---|---|
| WO | WO-2006032195 A1 * | 3/2006 | | G11B 20/00007 |
| WO | 2017113718 | 7/2017 | | |

\* cited by examiner

3D DISPLAY SYSTEM AND 3D DISPLAY METHOD

CROSS-REFERENCE TO RELATED APPLICATION

This application claims the priority benefit of Taiwan application serial no. 110114283, filed on Apr. 21, 2021. The entirety of the above-mentioned patent application is hereby incorporated by reference herein and made a part of this specification.

BACKGROUND

Technical Field

The disclosure relates to a display system, and particularly relates to a 3D display system and a 3D display method.

Description of Related Art

With the vigorous development of three-dimensional (3D) display technology, people can now be provided with a visually immersive experience. The 3D display technology may be divided into glasses-type 3D image display technology and naked-eye 3D image display technology. Although the glasses-type 3D image display technology is relatively mature, the use of 3D glasses may cause much inconvenience. Therefore, the naked-eye 3D image display technology has gradually become an area that many in the industries seek to develop. On the other hand, head-mounted displays (HMD) providing a 3D visual experience such as a mixed reality (MR) display or a virtual reality (VR) display have gradually become popular products on the market.

In the above 3D display technologies, the user's left eye is presented with a left-eye image and the user's right eye is presented with a right-eye image to create a 3D visual effect for the user. Therefore, to display an image of a specific stereo image format, the 3D display is required to adopt a corresponding 3D display technology, or the 3D display will not be able to display the image properly. In other words, no matter which 3D display technology is involved, the specification and hardware design of the 3D display and the user-related parameters should be taken into account so as to generate 3D display image contents suitable for displaying by the 3D display. However, the current 3D image contents on the market are not sufficient, so even if the user has a 3D display, the user still cannot fully and easily enjoy the display effect created by the 3D display.

SUMMARY

The disclosure provides a 3D display system and a 3D display method capable of converting an image content of various application programs into a 3D display image content which can be played by a 3D display to allow a user to experience a 3D visual effect.

An embodiment of the disclosure provides a 3D display system including a 3D display, a memory, and a processor. The processor is connected to the 3D display and the memory and is configured to execute the following steps. As a first type application program is executed, an image content of the first type application program is captured, and a stereo format image is generated according to the image content of the first type application program. The stereo format image is delivered to a runtime complying with a specific development standard through an application program interface complying with the specific development standard. A display frame processing associated with the 3D display is performed on the stereo format image through the runtime, and a 3D display image content generated by the display frame processing is provided to the 3D display for displaying.

An embodiment of the disclosure provides a 3D display method, adapted for a 3D display system. The 3D display method includes the following steps. As a first type application program is executed, an image content of the first type application program is captured, and a stereo format image is generated according to the image content of the first type application program. The stereo format image is delivered to a runtime complying with a specific development standard through an application program interface complying with the specific development standard. A display frame processing associated with a 3D display is performed on the stereo format image through the runtime, and a 3D display image content generated by the display frame processing is provided to the 3D display for displaying.

Based on the above, in the embodiments of the disclosure, an image content of various application programs may be converted into a stereo format image without being limited by the type of the application program. The stereo format image may be delivered to the runtime complying with the specific development standard through the application program interface complying with the specific development standard, so that the runtime may perform a display frame processing associated with the 3D display on the stereo format image by using hardware drivers or libraries associated with the 3D display. Therefore, the 3D display image content generated by the display frame processing can be properly displayed by the 3D display. Accordingly, the embodiments of the disclosure can expand the 3D content that can be displayed by the 3D display, so that the user can fully experience the display effect created by the 3D display.

To make the aforementioned more comprehensible, several embodiments accompanied with drawings are described in detail as follows.

DESCRIPTION OF THE EMBODIMENTS

Figure 1:
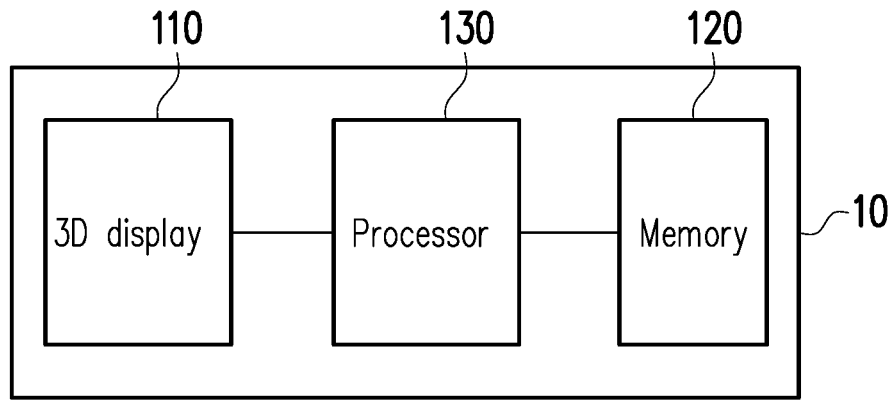
FIG. 1 is a schematic view showing a 3D display system according to an embodiment of the disclosure.

Some of the embodiments of the disclosure will be described in detail below with reference to the accompanying drawings. Components labeled with the same reference numerals shown in different drawings will be regarded as the same or similar components. The embodiments are only a part of the disclosure and do not disclose all the possible implementations of the disclosure. More specifically, the embodiments are only examples of the system and the method in the claims of the disclosure.

FIG. 1 is a schematic view showing a 3D display system according to an embodiment of the disclosure. Referring to FIG. 1, a 3D display system 10 may include a 3D display 110, a memory 120, and a processor 130. The processor 130 is coupled to the 3D display 110 and the memory 120. The 3D display system 10 may be a single integrated system or a distributed system. Specifically, the 3D display 110, the memory 120, and the processor 130 in the 3D display system 10 may be implemented as an all-in-one (AIO) electronic device such as a notebook computer or a tablet computer. Alternatively, the 3D display system 10 may be implemented by multiple electronic products, and the 3D display 110 may be connected to the processor 130 of the computer system via a wired transmission interface or a wireless transmission interface.

The 3D display 110 may allow a user to perceive a stereoscopic visual effect. To allow the user to perceive the 3D visual effect through the 3D display 110, the 3D display 110 may have the user's left eye and right eye respectively view image contents (i.e., a left-eye image and a right-eye image) corresponding to different viewing angles according to the hardware specification and applied 3D display technique of the 3D display 110. In some embodiments, the 3D display 110 may be a naked-eye 3D display or a glasses-type 3D display and may be implemented as, for example, a notebook computer display, a TV, a desktop screen, or an electronic signage. Alternatively, in some embodiments, the 3D display 110 may be implemented as a head-mounted display device such as an AR display device, a VR display device, or an MR display device.

On the other hand, the 3D display 110 may include a liquid crystal display (LCD), a light-emitting diode (LED) display, a field emission display (FED), an organic light-emitting diode (OLED) display, or other types of displays, and the disclosure is not limited thereto.

The memory 120 is configured to store data such as software modules (e.g., operating systems, application programs, and drivers) for the processor 130 to access and may be, for example, a fixed or movable random access memory (RAM), read-only memory (ROM), flash memory, or hard disk in any form, or a combination of the above.

The processor 130 is coupled to the memory 120 and the 3D display 110 and is, for example, a central processing unit (CPU), an application processor (AP), another programmable general-purpose or specific-purpose microprocessor, digital signal processor (DSP), image signal processor (ISP), graphics processing unit (GPU), another similar device, integrated circuit, or a combination of the above. The processor 130 may access and execute the software modules recorded in the memory 120 to implement the 3D display method in the embodiment of the disclosure. The above software modules may be generally interpreted to mean instructions, instruction sets, codes, program codes, programs, application programs, software packages, threads, processes, functions, etc., regardless of whether they are referred to as software, firmware, middleware, microcode, hardware description language, or the like.

Figure 2:
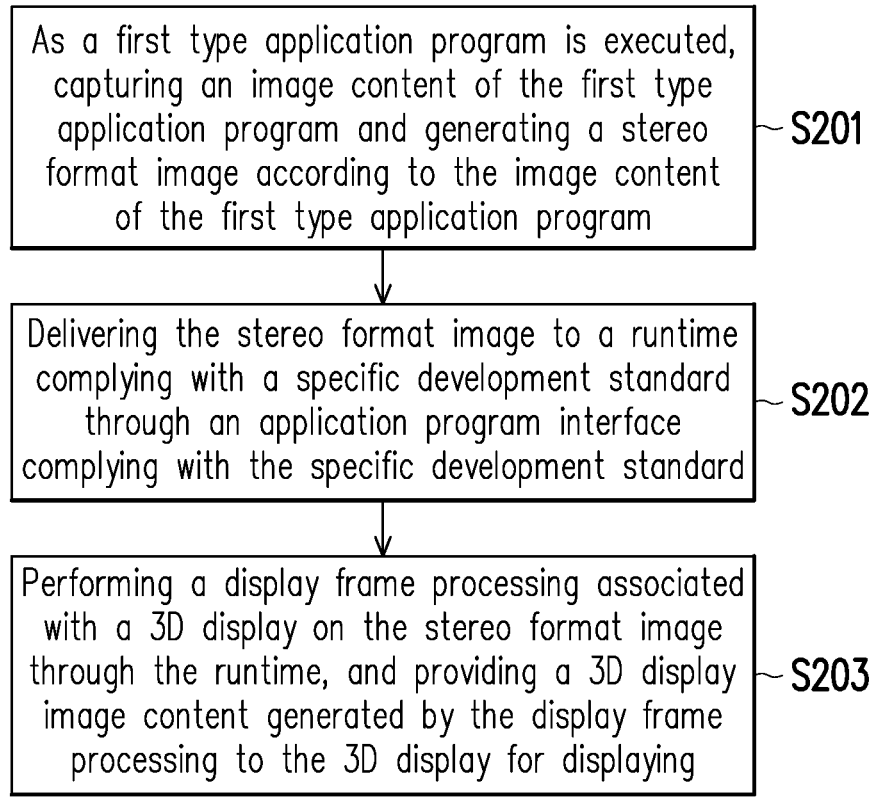
FIG. 2 is a flowchart showing a 3D display method according to an embodiment of the disclosure.

FIG. 2 is a flowchart showing a 3D display method according to an embodiment of the disclosure. Referring to FIG. 1 and FIG. 2, the method of this embodiment is applicable to the 3D display system 10 in the above embodiment, and the detailed steps of this embodiment will be described below with reference to the components in the 3D display system 10.

In step S201, as the processor 130 executes a first type application program, the processor 130 captures an image content of the first type application program and generates a stereo format image according to the image content of the first type application program. In some embodiments, the first type application program may be a desktop application program and may be installed on a computer device to execute application software of various tasks such as a browser program, a game program, a text editing program, a multimedia player program, a drawing program, etc., and the disclosure is not limited thereto.

It is noted that the first type application program is not an application program complying with a specific development standard. For example, the specific development standard may be the OpenXR standard, the OpenVR standard, or other software development standards for developing 3D display application programs, virtual reality application programs, and augmented reality application programs. In other words, the first type application program is not a standardized application program developed according to the OpenXR standard or the OpenVR standard. Therefore, as the processor 130 executes the first type application program, the image content of the first type application program generally does not comply with the stereo display format. The image content of the first type application program will not be delivered through an application program interface complying with the specific development standard to a runtime complying with the specific development standard for performing 3D display.

In the embodiment of the disclosure, by executing a standardized application program developed according to the specific development standard, the processor 130 can capture an image content of the first type application program and generate a stereo format image according to the image content of the first type application program. Specifically, in some embodiments, the processor 130 may use a screen capture technique such as "Desktop Duplication API" of the Windows operating system to capture the image content of the first type application program. In some embodiments, the processor 130 may capture the image content of the first type application program from the window of the first type application program by using an application program interface provided by the operating system. For example, the processor 130 may use a window screen capture technique such as "Windows Graphics Capture API" of the Windows operating system to capture the image content of the first type application program.

In other words, as the processor 130 executes the first type application program, the image content in the window of the first type application program is recorded in one render layer or a current display frame composed of multiple render layers. In some embodiments, the processor 130 may capture the image content of the first type application program by obtaining a partial or full image of the current display frame or one image layer from the memory 120. In addition, in some embodiments, the processor 130 may further perform other image processing on the captured image content, such as image scaling, image cropping, etc., and then perform the format conversion processing of the stereo display format.

After obtaining the image content of the first type application program, the processor 130 generates a stereo format image according to the image content of the first type application program. In some embodiments, the stereo format image is a side-by-side image complying with a side-by-side format. Specifically, in some embodiments, the processor 130 may determine whether the image content of the first type application program is a stereo format image complying with the stereo display format. The stereo display format may include a side-by-side (SBS) format or a topand-bottom (TB) format. For example, the processor 130 may determine whether the image content of the first type application program is a side-by-side image including a left-eye image and a right-eye image. If the image content of the first type application program is not a stereo format image complying with the stereo display format, the processor 130 may convert the image content of the first type application program into a stereo format image. For example, the processor 130 may generate a left-eye image and a right-eye image according to the image content of a single viewing angle to obtain a side-by-side image including the left-eye image and the right-eye image. In an embodiment, the processor 130 may convert the image content of the first type application program into a stereo format image through a neural network model. Alternatively, if the image content of the first type application program happens to be a stereo format image complying with the stereo display format, the processor 130 does not need to perform the format conversion processing of the stereo display format.

Next, in step S202, the processor 130 delivers the stereo format image to a runtime complying with the specific development standard through an application program interface complying with the specific development standard. In the embodiment of the disclosure, the application program interface complying with the specific development standard is implemented in the 3D display system 10, and the runtime is developed according to the specific development standard and the hardware characteristics of the 3D display 110. For example, the application program interface complying with the specific development standard may be an OpenXR API specified by the Khronos Group. The OpenXR API allows a standardized application program developed according to the OpenXR standard to communicate with the hardware driver of the 3D display 110. Therefore, in an embodiment, since the processor 130 obtains the stereo format image by executing a standardized application program developed according to the OpenXR standard and the runtime is also developed according to the OpenXR standard, the standardized application program developed according to the OpenXR standard can call the OpenXR API to deliver the stereo format image to the OpenXR runtime through the OpenXR API.

Afterwards, in step S203, the processor 130 performs a display frame processing associated with the 3D display 110 on the stereo format image through the runtime and provides a 3D display image content generated by the display frame processing to the 3D display 110 for displaying. Specifically, the processor 130 may further convert the stereo format image into a 3D display image content suitable for displaying by the 3D display 110 according to the hardware specification and applied 3D display technique of the 3D display 110. In other words, based on 3D display parameters provided by an underlying hardware driver of the 3D display 110, the processor 130 may obtain the 3D display image content according to the side-by-side image by using the display frame processing required by the 3D display 110. More specifically, the runtime may be regarded as a process being operated by the processor 130, and the runtime may communicate with the underlying hardware driver of the 3D display 110, e.g., using the parameters provided by the underlying hardware driver or using a library, etc.

In an embodiment, the 3D display 110 may be a naked-eye 3D display, and the display frame processing may include an image weaving processing. In other words, since the runtime is developed according to the specific development standard and the hardware characteristics of the 3D display 110, the runtime has the ability to use the library corresponding to the image weaving processing. Specifically, when the 3D display 110 is a naked-eye 3D display, it provides two images with parallax to the left eye and the right eye based on the lens refraction principle or the grating technique, so that the viewer can experience a stereoscopic display effect. Therefore, the processor 130 performs the image weaving processing on the stereo format image to interweave the pixel data of the left-eye image and the pixel data of the right-eye image to generate a single-frame image suitable for playing by the naked-eye 3D display.

Based on the description of the embodiment in FIG. 2, it is learned that the 3D display system 10 can convert an image content of various desktop application programs into a 3D display image content suitable for playing by the 3D display 110, thereby significantly expanding the scope of application of the 3D display.

In addition, it is noted that, in the embodiment of the disclosure, a standardized API complying with the specific development standard is deployed in the 3D display system 10. Therefore, as the processor 130 executes a second type application program complying with the specific development standard, the second type application program itself may call the standardized API and deliver a stereo format image complying with the stereo display format to the runtime to convert the stereo format image into a 3D display image content suitable for playing by the 3D display 110. For example, taking the OpenXR standard as an example, regardless of whether the processor 130 executes the first type application program which does not comply with the OpenXR standard or the second type application program which complies with the OpenXR standard, a side-by-side image may be delivered to the OpenXR runtime to allow the user to perceive the 3D visual effect through the 3D display 110.

Figure 3:
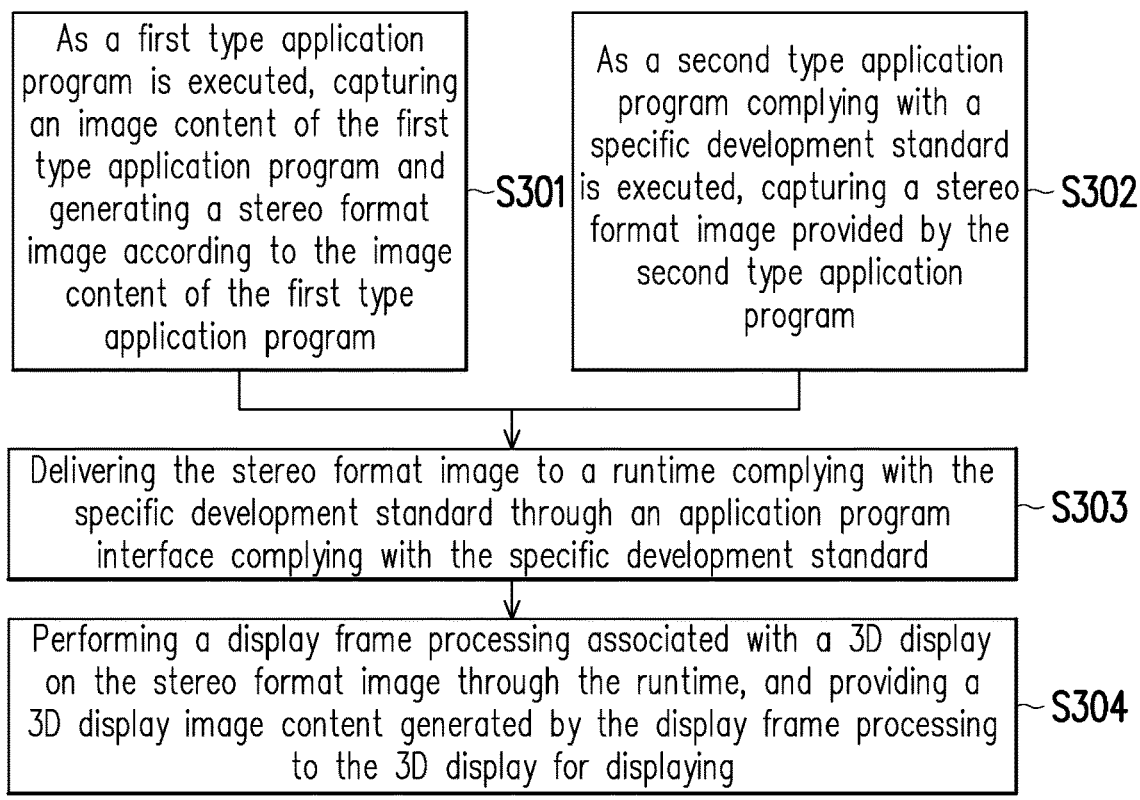
FIG. 3 is a flowchart showing a 3D display method according to an embodiment of the disclosure.

FIG. 3 is a flowchart showing a 3D display method according to an embodiment of the disclosure. Referring to FIG. 1 and FIG. 3, the method of this embodiment is applicable to the 3D display system 10 in the above embodiment, and the detailed steps of this embodiment will be described below with reference to the components in the 3D display system 10.

In step S301, as the processor 130 executes a first type application program, the processor 130 captures an image content of the first type application program and generates a stereo format image according to the image content of the first type application program. The implementation of step S301 may be sufficiently taught in the embodiment of FIG. 2 and shall not be repeatedly described herein.

In step S302, as the processor 130 executes a second type application program complying with a specific development standard, the processor 130 obtains a stereo format image provided by the second type application program. Here, in response to being executed, the second type application program provides the stereo format image to the runtime by using an application program interface complying with the specific development standard. For example, as the processor 130 executes an OpenXR application program (e.g., WebXR, etc.), the image content of the OpenXR application program is a side-by-side image and this side-by-side image will be delivered to the OpenXR runtime through the OpenXR API.

Then, in step S303, the processor 130 delivers the stereo format image to the runtime complying with the specific development standard through the application program interface complying with the specific development standard. In step S304, the processor 130 performs a display frame processing associated with the 3D display 110 on the stereo format image through the runtime and provides a 3D display image content generated by the display frame processing to the 3D display 110 for displaying. The implementation of steps S303 and S304 may be sufficiently taught in the embodiment of FIG. 2 and shall not be repeatedly described herein.

Therefore, in an embodiment, when the 3D display 110 is a naked-eye 3D display, regardless of whether the application program executed by the 3D display system 10 complies with the specific development standard, the runtime complying with the specific development standard can perform the image weaving processing without being limited by the type of the application program to obtain a single-frame image suitable for playing by the naked-eye 3D display.

Figure 4:
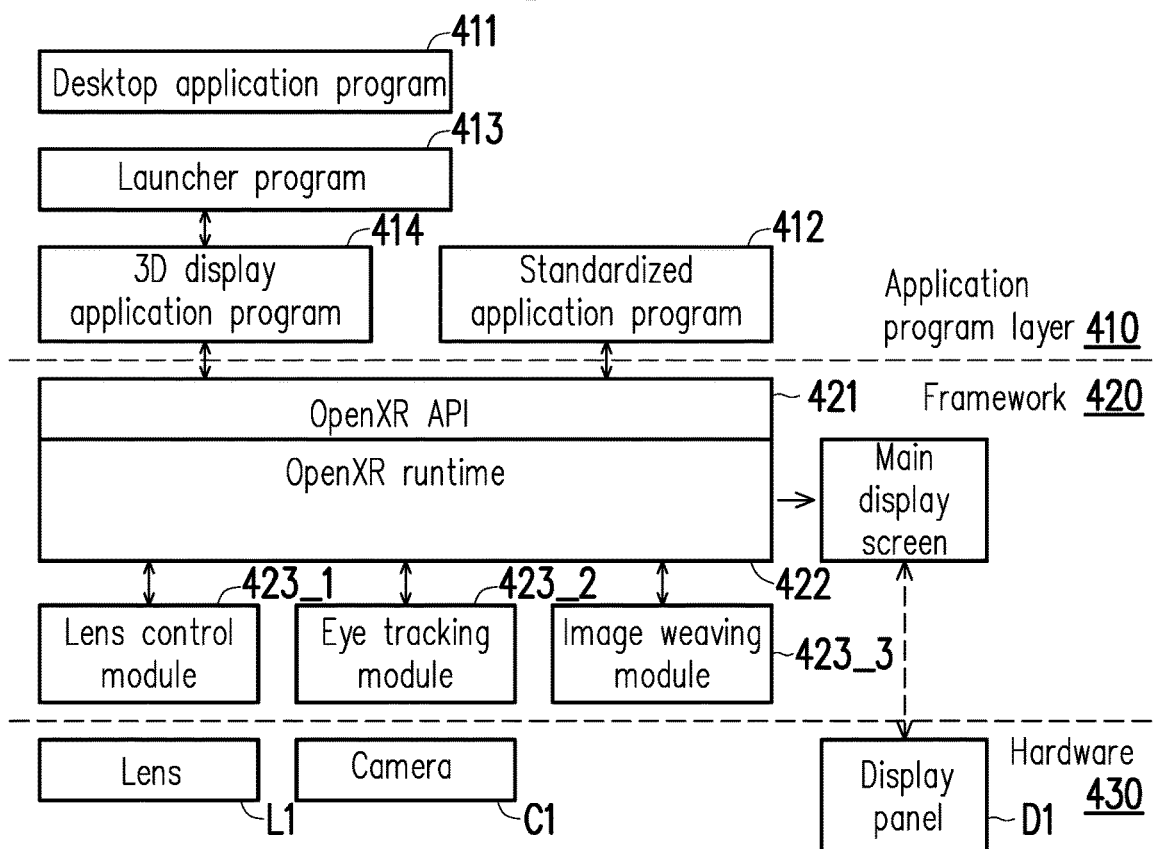
FIG. 4 is a schematic view showing a software architecture of a 3D display system according to an embodiment of the disclosure.

FIG. 4 is a schematic view showing a system hierarchical architecture of a 3D display system according to an embodiment of the disclosure. In the following embodiment, as an example for illustration, the 3D display 110 is a naked-eye display, and the specific development standard is the OpenXR standard. Referring to FIG. 4, the 3D display system 10 may include an application program layer 410, a framework 420, and hardware 430. The application program layer 410 may include a desktop application program 411 (i.e., a first type application program) and a standardized application program 412 (i.e., a second type application program) complying with the OpenXR standard or the OpenVR standard. In other words, the processor 130 may execute the desktop application program 411 and/or the standardized application program 412 complying with the OpenXR standard or the OpenVR standard. The framework 420 includes an OpenXR API 421 and an OpenXR runtime 422 which comply with the OpenXR standard, and a lens control module 423_1, an eye tracking module 423_2, and an image weaving module 423_3 which are respectively hardware drivers or libraries. The hardware 430 may include a lens L1, a camera C1, and a display panel D1.

In this embodiment, the application program layer 410 may further include a launcher program 413 and an 3D display application program 414 complying with the OpenXR standard. Specifically, in some embodiments, in response to a user operation, the processor 130 may capture an image content of the first type application program. The user operation may include controlling the first type application program to operate in a full-screen mode or performing a screenshot operation in the window of the first type application program by a cursor. In this embodiment, the launcher program 413 is configured to detect the user operation to determine whether to start relevant subsequent operations including capturing the image content of the desktop application program 411. The launcher program 413 may operate as a background program in the operating system, for example. In other words, when the processor 130 detects, through the launcher program 413, a user operation which satisfies a predetermined condition, the processor 130 may be triggered to start to execute the 3D display application program 414.

For example, during the execution of the desktop application program 411, in response to detection by the launcher program 413 that the desktop application program 411 is switched to the full-screen mode, the processor 130 starts to execute the 3D display application program 414. Alternatively, during the execution of the desktop application program 411, in response to detection by the launcher program 413 that the image content of the desktop application program 411 is a side-by-side image, the processor 130 starts to execute the 3D display application program 414. Alternatively, during the execution of the desktop application program 411, in response to detection by the launcher program 413 that one or more preset hot keys are pressed by the user, the processor 130 starts to execute the 3D display application program 414. Alternatively, during the execution of the desktop application program 411, in response to detection by the launcher program 413 that the cursor selects a specific range within the window of the desktop application program 411 to perform a screenshot operation, the processor 130 starts to execute the 3D display application program 414.

The 3D display application program 414 is a standardized application program developed according to the OpenXR standard, and it may be linked to the launcher program 413 through an application program interface. The 3D display application program 414 provides functions of image content capturing and image format conversion for the desktop application program 411. In other words, by executing the 3D display application program 414 through the processor 130, step S201 or step S301 of the above embodiments may be implemented. Accordingly, the processor 130 may generate a stereo format image according to the image content of the desktop application program 411 and deliver the stereo format image to the OpenXR runtime 422 through the OpenXR API 421. Then, the OpenXR runtime 422 may control the lens L1 to start through the lens control module 423_1, and the eye tracking module 423_2 may detect the eye information of the user through the camera 140. The OpenXR runtime 422 may convert the stereo format image into a 3D display image content through the image weaving module 423_3. The image weaving processing is adapted for converting an image content complying with the side-by-side image format into a 3D display image content determined based on the hardware architecture (e.g., a lens structure or a panel pixel design) of the 3D display 110 and the user parameters (e.g., the eye information of the user).

On the other hand, in this embodiment, as the processor 130 executes the standardized application program 412 complying with the OpenXR standard or the OpenVR standard, the standardized application program 412 itself may generate a stereo format image complying with the side-by-side format and deliver the stereo format image to the OpenXR runtime 422 through the OpenXR API 421. Then, the OpenXR runtime 422 may communicate with the underlying hardware driver or use the library associated with the 3D display 110 to provide a 3D display image content generated by the image weaving processing to the 3D display 110 for displaying.

In this embodiment, through the interfacing of the OpenXR API 421, the 3D display system 10 can convert an image content of the application program into a 3D display image content suitable for displaying by the 3D display 110 without being limited by the type of the application program. For a naked-eye 3D display, the user experience of using the naked-eye 3D display can be significantly improved. For example, when a user uses a multimedia player program to view a multimedia file, through a specific user operation, the user may use the naked-eye 3D display function to display the image played by the multimedia player program, so as to experience a floating effect (i.e., floating out of the screen) of the image played by the multimedia player program.

Figure 5:
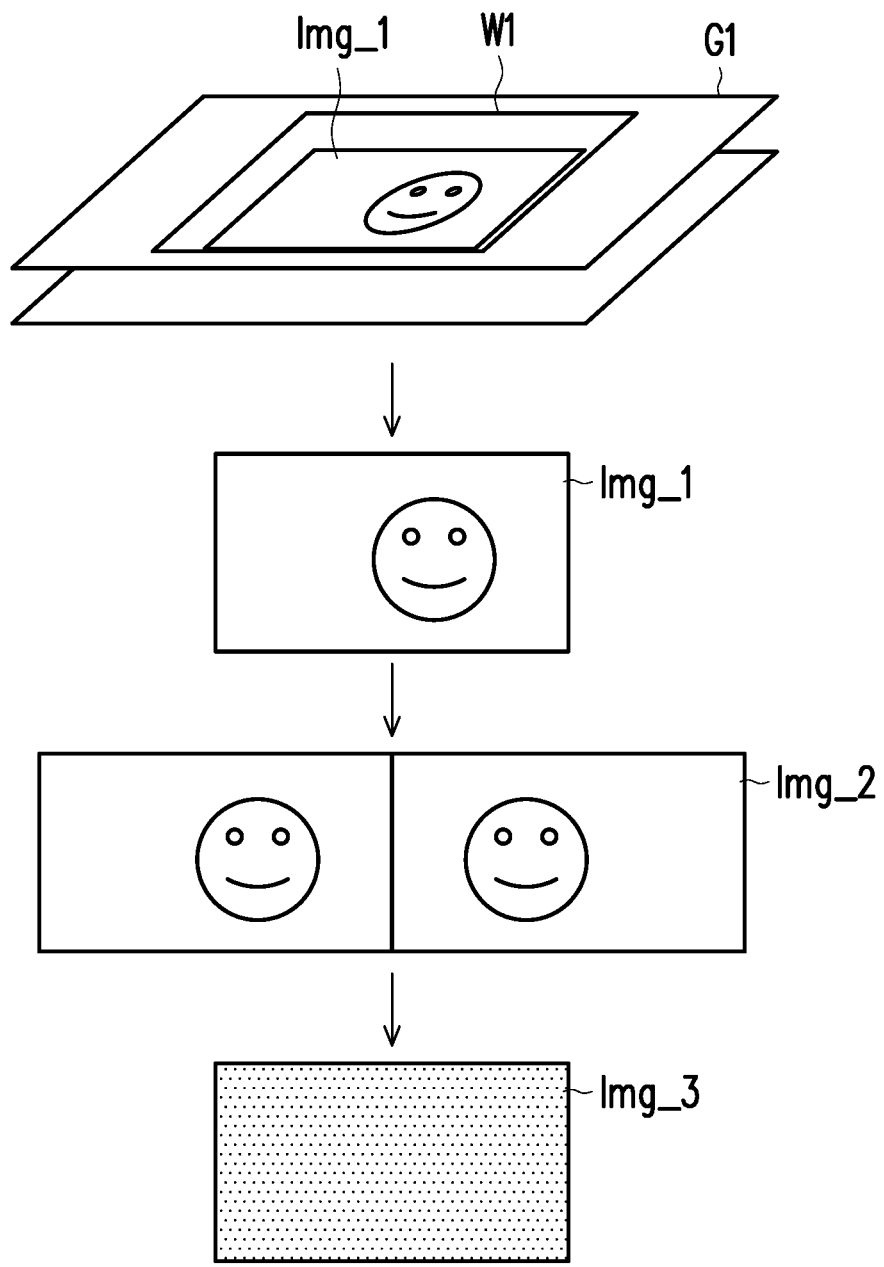
FIG. 5 is a schematic view showing generation of a 3D display image content according to an embodiment of the disclosure.

FIG. 5 is a schematic view showing generation of a 3D display image content according to an embodiment of the disclosure. It is assumed herein that the 3D display 110 is a naked-eye display and may be operated in a 2D display mode or a 3D display mode. Referring to FIG. 5, as the user uses a first type application program, the 3D display 110 operating in the 2D display mode may display a window W1 of the first type application program. The memory 120 records an image layer G1 corresponding to the window W1. In response to a specific user operation, the 3D display 110 switches to the 3D display mode, and in response to the specific user operation, the processor 130 may capture an image content Img_1 in the window W1 from the memory 120. Next, the processor 130 may convert the image content Img_1 into a side-by-side image Img_2. The side-by-side image Img_2 is delivered to the runtime complying with the OpenXR standard through the OpenXR API. Then, the processor 130 may perform an image weaving processing associated with the naked-eye 3D display 110 on the side-by-side image Img_2 to generate a 3D display image content Img_3. When the naked-eye 3D display 110 operating in the 3D display mode displays the 3D display image content Img_3, the user can perceive a 3D visual effect of the display object floating out of the screen.

In summary of the above, in the embodiments of the disclosure, an image content of various application programs may be captured by a standardized application program developed according to a specific development standard, and the image content of the various application programs may be converted into a 3D display image content suitable for displaying by the 3D display without being limited by the type of the application program. Accordingly, the 3D content that can be displayed by the naked-eye 3D display can be expanded. In addition, as an application program which does not comply with the specific development standard is executed, by capturing from the memory an image layer data corresponding to the application program window or a screen picture in the full-screen mode, the user may select the image content to be converted into a 3D display image content, which allows the user to fully experience the 3D visual effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A 3D display system comprising:
a 3D display, providing different images for a left eye and a right eye of a viewer at the same time;
a memory; and
a processor connected to the 3D display and the memory, the processor being configured to:
as a first type application program is executed, capture an image content of the first type application program and generate a stereo format image including a left image and a right image according to the image content of the first type application program, wherein the first type application program is not an application program complying with a specific development standard,
deliver, by an application program complying with the specific development standard, the stereo format image to a runtime complying with the specific development standard through an application program interface complying with the specific development standard, wherein the runtime is developed according to the specific development standard and hardware characteristics of the 3D display, and the application program complying with the specific development standard is configured to call the application program interface complying with the specific development standard to deliver the stereo format image to the runtime complying with the specific development standard; and
perform a display frame processing associated with the 3D display on the stereo format image through the runtime and provide a 3D display image content generated by the display frame processing to the 3D display for displaying the left image and the right image in a stereoscopic displaying effect.

2. The 3D display system according to claim 1, wherein the processor is further configured to:
as a second type application program complying with the specific development standard is executed, obtain the stereo format image provided by the second type application program, wherein, in response to being executed, the second type application program provides the stereo format image to the runtime by using the application program interface complying with the specific development standard.

3. The 3D display system according to claim 1, wherein the stereo format image is a side-by-side image complying with a side-by-side format, and the specific development standard is an OpenXR standard.

4. The 3D display system according to claim 1, wherein the processor is further configured to:
capture the image content of the first type application program from a window of the first type application program by using an application program interface provided by an operating system.

5. The 3D display system according to claim 1, wherein the processor is further configured to:
determine whether the image content of the first type application program is the stereo format image complying with a stereo display format, and
if the image content of the first type application program is not the stereo format image complying with the stereo display format, convert the image content of the first type application program into the stereo format image complying with the stereo display format.

6. The 3D display system according to claim 1, wherein the 3D display is a naked-eye 3D display, and the display frame processing comprises an image weaving processing.

7. The 3D display system according to claim 1, wherein the processor is further configured to:
in response to a user operation, capture the image content of the first type application program, wherein the user operation comprises controlling the first type application program to operate in a full-screen mode or performing a screenshot operation in a window of the first type application program by a cursor.

8. The 3D display system according to claim 1, wherein the runtime is developed according to the specific development standard and hardware characteristics of the 3D display.

9. A 3D display method, adapted for a 3D display system, the 3D display method comprising:
as a first type application program is executed, capturing an image content of the first type application program and generating a stereo format image including a left image and a right image according to the image content of the first type application program, wherein the first type application program is not an application program complying with a specific development standard;
delivering, by an application program complying with the specific development standard, the stereo format image to a runtime complying with the specific development standard through an application program interface complying with the specific development standard, wherein the runtime is developed according to the specific development standard and hardware characteristics of the 3D display, and the application program complying with the specific development standard is configured to call the application program interface complying with the specific development standard to deliver the stereo format image to the runtime complying with the specific development standard; and performing a display frame processing associated with a 3D display on the stereo format image through the runtime and providing a 3D display image content generated by the display frame processing to the 3D display for displaying the left image and the right image in a stereoscopic displaying effect, wherein the 3D display is configured to provide different images for a left eye and a right eye of a viewer at the same time.

10. The 3D display method according to claim 9, further comprising:

as a second type application program complying with the specific development standard is executed, obtaining the stereo format image provided by the second type application program, wherein, in response to being executed, the second type application program provides the stereo format image to the runtime by using the application program interface complying with the specific development standard.

11. The 3D display method according to claim 9, wherein the stereo format image is a side-by-side image complying with a side-by-side format, and the specific development standard is an OpenXR standard.

12. The 3D display method according to claim 9, wherein the step of capturing the image content of the first type application program and generating the stereo format image according to the image content of the first type application program as the first type application program is executed comprises:

capturing the image content of the first type application program from a window of the first type application program by using an application program interface provided by an operating system.

13. The 3D display method according to claim 9, wherein the step of capturing the image content of the first type application program and generating the stereo format image according to the image content of the first type application program as the first type application program is executed comprises:

determining whether the image content of the first type application program is the stereo format image complying with a stereo display format; and if the image content of the first type application program is not the stereo format image complying with the stereo display format, converting the image content of the first type application program into the stereo format image complying with the stereo display format.

14. The 3D display method according to claim 9, wherein the 3D display is a naked-eye 3D display, and the display frame processing comprises an image weaving processing.

15. The 3D display method according to claim 9, wherein the step of capturing the image content of the first type application program and generating the stereo format image according to the image content of the first type application program as the first type application program is executed comprises:

in response to a user operation, capturing the image content of the first type application program, wherein the user operation comprises controlling the first type application program to operate in a full-screen mode or performing a screenshot operation in a window of the first type application program by a cursor.

16. The 3D display method according to claim 9, wherein the runtime is developed according to the specific development standard and hardware characteristics of the 3D display.

* * * * *